US009082207B2

(12) United States Patent
Walker et al.

(10) Patent No.: US 9,082,207 B2
(45) Date of Patent: Jul. 14, 2015

(54) SYSTEM AND METHOD FOR AUTOMATIC LAYOUT OF PRINTED MATERIAL ON A THREE-DIMENSIONAL STRUCTURE

(75) Inventors: John Oliver Walker, Rochester, NY (US); Barry Glynn Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 691 days.

(21) Appl. No.: 12/621,248

(22) Filed: Nov. 18, 2009

(65) Prior Publication Data

US 2011/0116133 A1 May 19, 2011

(51) Int. Cl.
*G06T 11/00* (2006.01)
*G06K 15/02* (2006.01)
*G06T 15/04* (2011.01)
*G06T 19/20* (2011.01)

(52) U.S. Cl.
CPC ............. *G06T 11/00* (2013.01); *G06K 15/021* (2013.01); *G06T 15/04* (2013.01); *G06T 19/20* (2013.01)

(58) Field of Classification Search
USPC ........................................ 493/325
See application file for complete search history.

(56) References Cited

U.S. PATENT DOCUMENTS

| | | | |
|---|---|---|---|
| 3,902,655 A | 9/1975 | Huffman | |
| 4,167,265 A | 9/1979 | Whittenberger | |
| 4,236,955 A | 12/1980 | Prittie | |
| 4,834,695 A | 5/1989 | Boblit et al. | |
| 5,078,666 A | 1/1992 | Porret et al. | |
| 5,104,365 A | 4/1992 | Sone et al. | |
| 5,235,519 A | 8/1993 | Miura | |
| 5,291,583 A | 3/1994 | Bapat | |
| 5,353,390 A | 10/1994 | Harrington | |
| 5,457,904 A | 10/1995 | Colvin | |
| 5,513,117 A | 4/1996 | Small | |
| 5,518,574 A | 5/1996 | Yates et al. | |
| 5,528,517 A | 6/1996 | Loken | |
| 5,538,288 A * | 7/1996 | Heath ............................... 283/2 |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |

(Continued)

FOREIGN PATENT DOCUMENTS

| | | |
|---|---|---|
| JP | 2004334333 A | 11/2004 |
| WO | 2005000681 A2 | 1/2005 |

(Continued)

OTHER PUBLICATIONS http/www.esko.com/tmp/080606115325/G2558322_Kongsberg_tables_us_pdf.

(Continued)

*Primary Examiner* — Nicholas Pachol
(74) *Attorney, Agent, or Firm* — Fox Rothschild LLP

(57) ABSTRACT

A method and system for printing content on a three dimensional structure, select a first graphical design style sheet for a first facet of the structure. A graphical design layout renderer to apply semantic structural design data to the style sheet until a graphic design template is prepared. Graphical content is linked to the structure and printed on the substrate using the design data. The system determines the location by facet of the content, and ensures that larger content items are distributed among multiple facets of the structure.

22 Claims, 7 Drawing Sheets

(56) References Cited

U.S. PATENT DOCUMENTS

| | | | |
|---|---|---|---|
| 5,923,556 A | 7/1999 | Harris | |
| 6,005,959 A | 12/1999 | Mohan et al. | |
| 6,090,027 A * | 7/2000 | Brinkman | 493/325 |
| 6,092,054 A | 7/2000 | Tackbary et al. | |
| 6,117,061 A * | 9/2000 | Popat et al. | 493/325 |
| 6,134,018 A | 10/2000 | Dziesietnik et al. | |
| 6,153,039 A | 11/2000 | Jacobsen | |
| 6,237,787 B1 | 5/2001 | Gallo et al. | |
| 6,243,172 B1 | 6/2001 | Gauthier et al. | |
| 6,246,468 B1 | 6/2001 | Dimsdale | |
| 6,310,964 B1 | 10/2001 | Mohan et al. | |
| 6,332,149 B1 | 12/2001 | Warmus et al. | |
| 6,409,019 B1 | 6/2002 | Hornsby et al. | |
| 6,505,858 B1 * | 1/2003 | Kirchmeyer et al. | 283/81 |
| 6,666,332 B1 * | 12/2003 | DeWolf et al. | 206/459.5 |
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |
| 6,896,250 B2 | 5/2005 | Hillebrand | |
| 6,939,063 B2 | 9/2005 | Bussell | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,197,465 B1 | 3/2007 | Hu et al. | |
| 7,243,303 B2 | 7/2007 | Purvis et al. | |
| 7,293,652 B2 | 11/2007 | Learn et al. | |
| 7,327,362 B2 | 2/2008 | Grau | |
| 7,346,408 B2 * | 3/2008 | Van Bael et al. | 700/98 |
| 7,366,643 B2 * | 4/2008 | Verdura et al. | 703/1 |
| 7,406,194 B2 | 7/2008 | Aizikowitz et al. | |
| 7,617,276 B2 | 11/2009 | Bui | |
| 7,647,752 B2 | 1/2010 | Magnell | |
| 7,832,560 B2 | 11/2010 | Tilton | |
| 2002/0030854 A1 | 3/2002 | Schutz et al. | |
| 2002/0085001 A1 | 7/2002 | Taylor | |
| 2002/0118874 A1 | 8/2002 | Chung et al. | |
| 2002/0138573 A1 | 9/2002 | Saguy | |
| 2002/0153265 A1 * | 10/2002 | Leung et al. | 206/232 |
| 2003/0004997 A1 | 1/2003 | Parker et al. | |
| 2003/0035138 A1 * | 2/2003 | Schilling | 358/1.15 |
| 2003/0083763 A1 | 5/2003 | Kiyohara et al. | |
| 2003/0091227 A1 | 5/2003 | Chang et al. | |
| 2003/0098994 A1 * | 5/2003 | Tacke | 358/1.18 |
| 2003/0164875 A1 | 9/2003 | Myers | |
| 2003/0200111 A1 | 10/2003 | Damji | |
| 2003/0210313 A1 | 11/2003 | Nedblake et al. | |
| 2004/0073407 A1 | 4/2004 | Nguyen et al. | |
| 2004/0120603 A1 | 6/2004 | Gupta | |
| 2004/0190063 A1 * | 9/2004 | Brown | 358/1.18 |
| 2005/0005261 A1 | 1/2005 | Severin | |
| 2005/0050052 A1 | 3/2005 | Zimmerman et al. | |
| 2005/0157342 A1 * | 7/2005 | Bru | 358/1.18 |
| 2005/0249400 A1 | 11/2005 | Fukumoto | |
| 2006/0031770 A1 | 2/2006 | McMenamin | |
| 2006/0080274 A1 | 4/2006 | Mourad | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1 | 2/2007 | Rietjens et al. | |
| 2007/0112460 A1 | 5/2007 | Kiselik | |
| 2007/0172986 A1 | 7/2007 | Huang et al. | |
| 2007/0237424 A1 | 10/2007 | Burg et al. | |
| 2007/0248394 A1 * | 10/2007 | Isowa | 400/76 |
| 2008/0048308 A1 | 2/2008 | Lam | |
| 2008/0255945 A1 | 10/2008 | Percival et al. | |
| 2009/0063381 A1 | 3/2009 | Chan et al. | |
| 2009/0070213 A1 | 3/2009 | Miller et al. | |
| 2009/0236752 A1 | 9/2009 | Lee et al. | |
| 2009/0282782 A1 | 11/2009 | Walker et al. | |
| 2009/0287632 A1 | 11/2009 | Gombert et al. | |
| 2009/0287717 A1 | 11/2009 | Gombert et al. | |
| 2010/0060909 A1 | 3/2010 | Conescu et al. | |
| 2010/0098319 A1 | 4/2010 | Gombert et al. | |
| 2010/0110479 A1 | 5/2010 | Gombert et al. | |
| 2011/0054849 A1 * | 3/2011 | Walker et al. | 703/1 |

FOREIGN PATENT DOCUMENTS

| | | |
|---|---|---|
| WO | 2005054983 A2 | 6/2005 |
| WO | 2005122079 A2 | 12/2005 |
| WO | WO 2007021920 A2 | 2/2007 |

OTHER PUBLICATIONS

Liang Lu et al, "Folding Cartons with Fixtures: A Motion Planning Approach", IEEE Transactions on Robotics and Automation, vol. 16, No. 4, Aug. 2000.

Johnson K., "Automatic 3D Packaging Optimization Project", CTMA Symposium, Salt Lake City, Apr. 2, 2003.

* cited by examiner

SYSTEM AND METHOD FOR AUTOMATIC LAYOUT OF PRINTED MATERIAL ON A THREE-DIMENSIONAL STRUCTURE

RELATED APPLICATION

This application is related to co-pending U.S. patent application Ser. No. 12/261,054 filed Nov. 18, 2009.

BACKGROUND

The disclosed embodiments relate generally to methods and systems for automatic layout of graphics, text, and other printed content on a package or other three-dimensional structure.

In order to create a package, the package assembly process typically requires multiple participants and resources. For example, to determine the structure of the package and location of printed content on the package, a person known as a brand manager works with a structural designer to manually develop an appropriate structural design definition that meets specified requirements. The structural design definition must be compatible with the technical constraints arising from available production process equipment. The structural design definition is then forwarded to a packaging design agency to create graphics for use in the printing process.

Packaging design agencies spend a substantial amount of time creating samples and prototypes of packaging concepts for the brand owners. Typically, a package design process requires several iterations to arrive at an agreed-upon design for a package. The iterative process is often done in an ad hoc manner. This process can be very costly to brand owners because design agencies typically charge by the amount of time spent on a job. Numerous hours are spent creating samples and following up with the client, only to go back to the drawing board. Often, the process can take weeks or months before arriving at a suitable design concept.

Once the structural and graphic designs are finalized, the graphic design is used to create a set of plates for the printing process, and the structural design is used in the creation of a compatible set of dies. The packaging flats are then printed, die-cut and converted to a form (e.g., ready to erect) that is compatible with the fulfillment process.

This process introduces the potential for errors due to the iterative nature of creating structural and graphic designs. Also, the process has long lead times and a slow turn around time which results in an extended product development cycle. Accordingly, the flexibility of creating new packages and graphics is limited. As such, it is time consuming and expensive to create sample packages and prototypes using the conventional process.

SUMMARY

In an embodiment, a method of printing content on a three dimensional structure includes selecting a first graphical design style sheet for a first facet of a three dimensional structure, wherein the style sheet includes rules for graphical content to be printed on the facet. The method also includes using a graphical design layout renderer to apply semantic structural design data to the style sheet, and repeating the selecting and Optionally, the method may include displaying the graphical content as it will appear on the structure, receiving a user selection to change an attribute of the printed content, verifying that the user selection is consistent with the rules, and if so printing the graphical content with the user-selected change on the substrate. The method also may include determining whether the graphical content is a background image, an image that will not fit on an intended facet, or another image that will span a plurality of facets. If so, the linking may include grouping the first facet and a second facet to form a facet group, and then linking the graphical content to the facet group so that when the three dimensional structure is printed, a first portion of the content appears on the first facet, and a second portion of the content appears on the second facet. This may include expanding the graphical content so that the background image spans adjacent facets.

In an alternate embodiment, a package design rendering system includes a first memory portion containing semantic structural design data, a second memory portion containing a graphical design style sheet for multiple facets for a three-dimensional package, a graphical design layout renderer that applies the semantic structural design data to the style sheet to generate a graphical design template, and an asset linker that links one or more graphical assets with the graphical design template to create a graphical design for the package. The system also may include a display that displays a representation of the graphical design on the package, a user input that accepts a user-selected change to the graphical design, a printing device that prints the graphical design on a substrate, and one or more assembly devices that form the substrate into the three-dimensional package.

In the system, the graphical design layout renderer may contain program instructions that instruct the linker to determine whether the graphical content will span a plurality of facets. If so, the asset linker contains program instructions that instruct the linker to ensure that the graphical concept properly spans the facets.

BRIEF DESCRIPTION OF FIGURES

Aspects, features, benefits and advantages of the embodiments described herein will be apparent with regard to the following description, appended claims, and accompanying drawings where:

DETAILED DESCRIPTION

Figure 1:
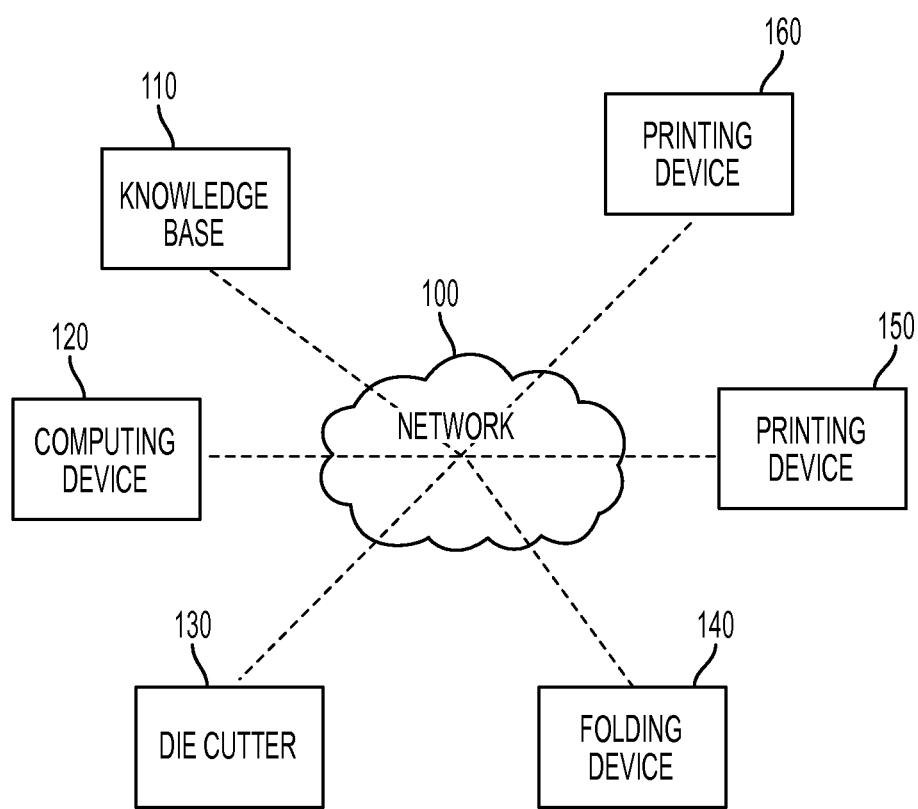
FIG. 1 illustrates a system for assembling a package according to an embodiment.

The invention described in this document is not limited to the particular systems, methodologies or protocols described, as these may vary. Also, the terminology used in this document is for the purpose of describing particular embodiments, and it is not intended to limit the scope of the present disclosure.

Unless defined otherwise, all technical and scientific terms used herein have the same meanings as commonly understood by one of ordinary skill in the art. As used in this document, the singular forms "a," "an," and "the" include the plural reference unless the context clearly dictates otherwise. Also, as used herein, the term "comprising" means "including, but not limited to."

An "assembly device" is a device used in a manufacturing or assembly process that performs an operation. For example, an assembly device for a package construction process. For example, assembly devices may be a printing device, a die cutter, a folding device, or another device that is used to create a finished package. A package assembly device may perform operations such as printing, scanning, folding, sealing, creasing and/or perforating.

A "computing device" is any processor-based device such as, for example, a server, a personal computer, a personal digital assistant, a web-enabled phone, a smart terminal, a dumb terminal and/or other electronic device capable of communicating in a networked environment. A computing device processes data to perform one or more functions. A computing device may interpret and execute instructions.

A "facet" is a part of a three-dimensional structure of a package. For example, a facet of a package may be a flap or side of the package.

A "knowledge base" is an electronic repository of searchable data and/or rules. A knowledge base may refer to software or a data structure, such as a database or a table. Alternatively, a knowledge base may refer to a hardware component containing data, such as a section of a tangible storage medium. When discussed below, a "semantic knowledge base" is a type of knowledge base that contains data in the form of an ontology.

An "ontology" is a representation of concepts within a subject matter and the relationships between the concepts. An ontology is used for computational reasoning regarding the properties of the subject matter. In an ontology, the individual concepts within the subject matter may be stored as objects (which are sometimes referred to as individuals or instances). An ontology also includes classes (i.e., categories or groups to which each object belongs), attributes (i.e., features or characteristics) of each object, and relations (i.e., ways in which objects may be related to other objects, or ways in which classes may be related to other classes).

A "printing device" is an electronic device that is capable of receiving commands, and/or printing content such as text, other characters, patterns, shapes, and/or images on a substrate. Printing devices may include, but are not limited to, network printers, production printers, copiers and other devices using ink or toner, and scanners. Printing devices may also perform a combination of functions such as printing/scanning, in which case such devices may be considered to be multifunctional devices.

A "semantic reasoner" is a processing module (such as a software application that is operated in a computing device, or firmware that executes in processing hardware) that accesses and operates on the data contained in a semantic knowledge base to infer logical consequences from an asserted set of facts. Examples of semantic reasoners include, but are not limited to, those known as Pellet, Racer, and FaCT++.

FIG. 1 illustrates a system for assembling a package according to an embodiment. As shown in FIG. 1, the system includes a knowledge base 110, a computing device 120, one or more assembly devices 130, 140, one or more printing devices 150, 160 and a network 100. A network 100 may include, but is not limited to, a local area network (LAN), a wide area network (WAN), the Internet, an intranet and/or any other communications network.

The knowledge base 110 includes data in the form of an ontology, created using an ontology language such as the web ontology language (OWL), which is endorsed by the World Wide Web Consortium, or another format that allows for the description of classes, attributes, individuals, and associated relationships between various structural design constructs. The structural design constructs define individual objects of a class and provide attribute/value pairs for the individual objects and restrictions for certain classes. The class concept may be used to represent a group or set of individual objects with similar characteristics. Package design elements for folding cartons, such as panels, flaps and tabs, are examples of potential classes. Attributes may be used to associate individuals or design elements. For example, an attribute such as "hasPanel" might link an individual "Panel" to an individual "Sleeve." In an embodiment, individuals of a class may provide representations of physical and/or virtual aspects of a structural design.

The knowledge base 110 may communicate directly or via a network 115 with a computing device 120, one or more three-dimensional structure assembly devices such as a die cutter 130 and folding device 140, and one or more printing devices 150, 160. In an embodiment, the knowledge base 110 may be distributed across a plurality of devices including, but not limited to, the computing device 120, the assembly devices 130, 140 and the one or more printing devices 150, 160. In an embodiment, the knowledge base 110, or a portion thereof, may be contained within one or more of the assembly devices 130, 140, the computing device 120 and/or the one or more printing devices 150, 160. In such an embodiment, the knowledge base 110 may directly communicate with the computing device 120, the one or more assembly devices 130, 140 and/or the one or more printing devices 150, 160 in which it is contained instead of via the network 100.

Figure 2:
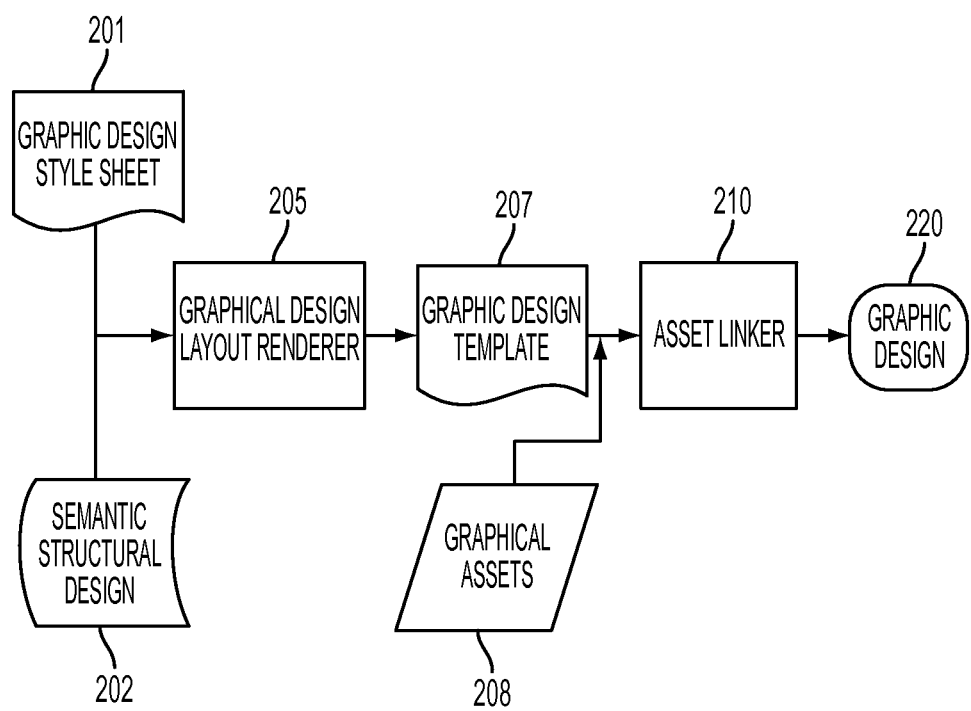
FIG. 2 depicts exemplary elements of a system for applying content to a structural design.

FIG. 2 is a block diagram of the elements of a system for automatically creating a graphical design for a package or other three-dimensional structure. As shown in FIG. 2, a graphical design layout renderer 205 produces a graphical design template 207 using data from a graphical design style sheet 201 and semantic structural design data 202. The graphical design template 207, style sheet 201, and structural design data 202 are data files or other data structures, exemplary features of which are described below in the discussion of FIG. 3. A graphical design layout renderer 205 is a set of hardware, software, or firmware containing program instructions that cause a processor to create a design template based on known constraints. An example of such a system for two-dimensional documents is described in U.S. Pat. No. 7,243, 303 to Purvis et al., the disclosure of which is incorporated herein by reference in its entirety. In an embodiment, the renderer 205 may include a semantic reasoner.

An asset linker 210 links graphical assets 208 such as text, images or graphics to the graphic design template 207 to create a graphic design data file 220 for use in printing the three-dimensional structure. The asset linker 210 is a set of hardware, software, or firmware containing program instructions that cause a processor to populate the fields of a graphic design template 207 with selected graphical assets 208. The asset linker 210 may permit a user to select the graphical assets, it may receive predetermined graphical assets, or it may select graphical assets based on a set of rules.

Figure 3:
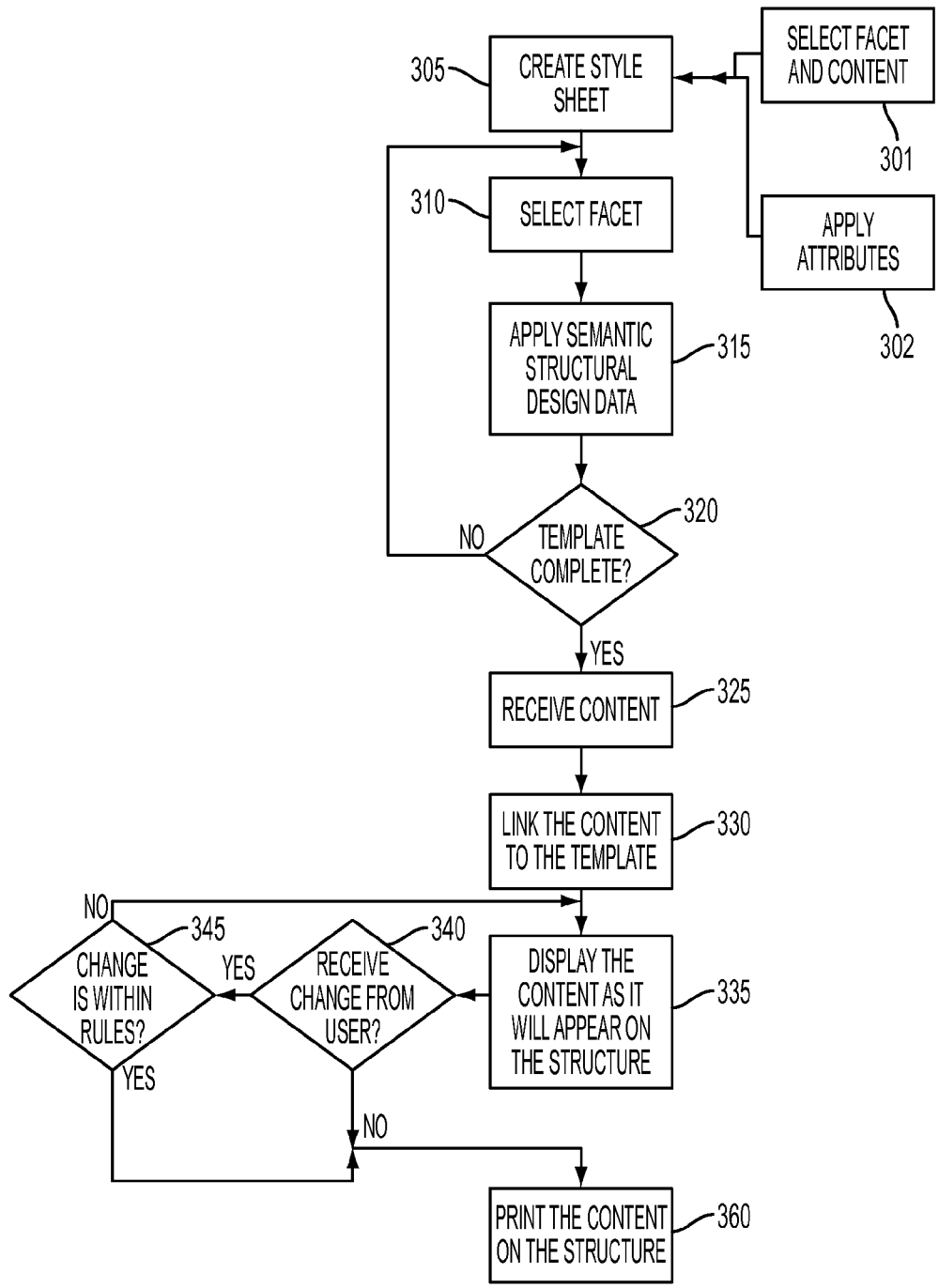
FIG. 3 depicts a method of applying content to a three dimensional packaging structure according to an embodiment.

Certain elements shown in FIG. 2 will be explained in more detail with reference to FIG. 3, which depicts a flowchart of an exemplary method of applying content to a three dimensional packaging structure according to an embodiment. A graphical design style sheet (201 in FIG. 2) may be selected or created 305 for a package or other three dimensional structure. A style sheet includes a list of rules. Each rule includes one or more selectors, and a declaration block containing one or more declarations. A selector is a portion of a rule that specifies a facet of the structure, as well as an element to be printed having attributes that will be affected by the rule's declaration block. For example, an exemplary selector may read as follows:

Facet@view="Front"[image]

Each declaration in the declaration block includes a property and a value. A declaration block may include several declarations separated by semicolons or other indicia. An exemplary declaration block is:

{location:topleft; scaling:scale[20]; border-style: no-border}

In other words, a declaration sets forth the effect that a rule will have on the facet specified in the selector. In the example above, the rule indicates that the front facet of a structure may have an image printed in a position in the top left area of the facet, with a scale of 20 and no border. For a package design style sheet, exemplary declaration values include, and are not limited to:

Facet@view="xxx" [image|graphics]
<Location>:topleft, topcenter, topright, middleleft, center, middleright, bottomleft, bottomcenter, bottomright
<Scale>: scale/no-scale [relative size %]
<Border>: border/no-border [color, style, weight]
<Transparency>: transparency [%]
Facet@view="xxx" [text|graphics]
<Location>:topleft, topcenter, topright, middleleft, center, middleright, bottomleft, bottomcenter, bottomright
<Fill>: color [rgb value]
<Border>: border/no-border [color, style, weight]
<Font>: font-family [color, style, weight]

The style sheet may be created by selecting 301 a facet of the three dimensional structure and identifying a graphical content element to be printed on that facet (i.e., creating the selector), and applying 302 one or attributes to the graphical content element (i.e., creating the declaration block).

Figure 4:
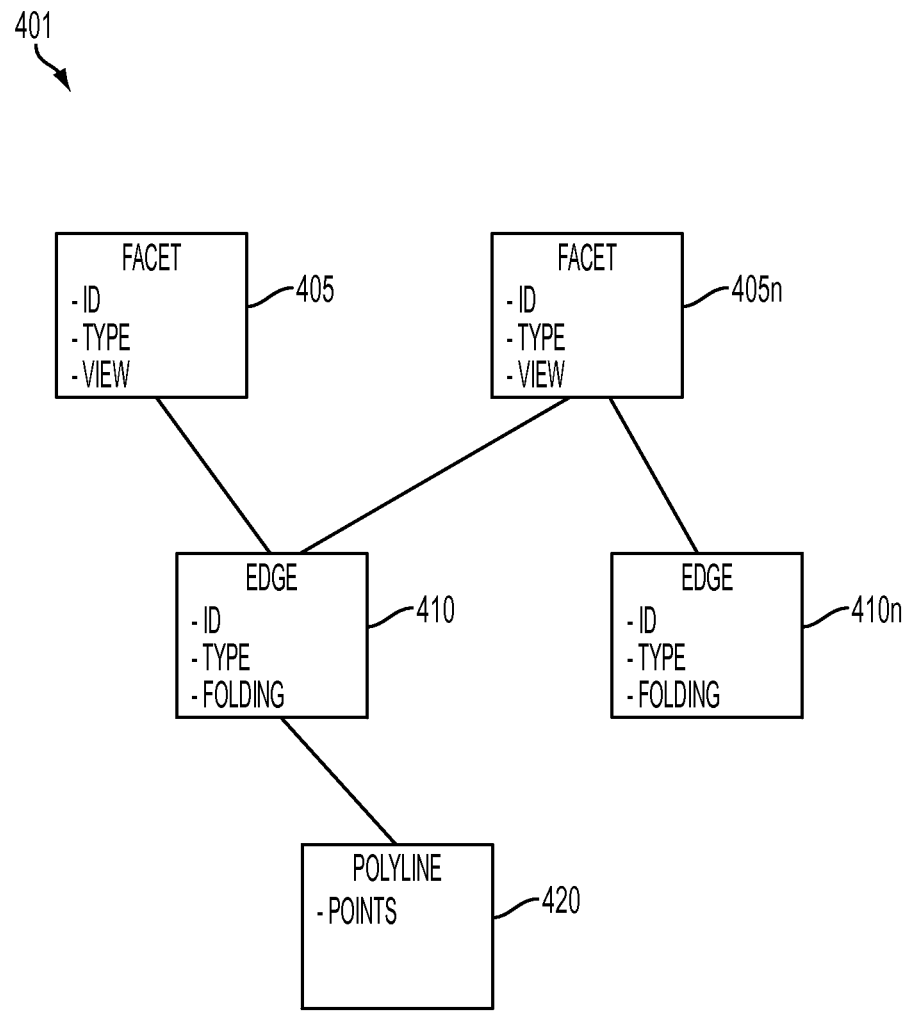
FIG. 4 depicts an exemplary data structure for a three dimensional model of a package according to an embodiment.

The semantic structural design data (element 202 in FIG. 2) may be selected or created to include information about various facets of the three dimensional structure. As noted above, a facet is part of the structure such as a flap or side of the package. Each facet has a plurality of edges, and as noted in FIG. 4, the structural design data for a particular structure 401 includes facet information 405 about each facet such as a unique identifier, its type (e.g., full, perforated, die-cut with angles, etc.), and its view (e.g., top, side, bottom). Facet types may include, but are not limited to, an end panel, a top panel, a side panel, a charlotte, a flange, a cover panel, a front panel and/or a back panel. Each facet is linked in the data structure to edge details 410-410n about each of its edges. Edge details may include a unique identifier, type (e.g., fold, perforation, or cut), folding angle and/or folding dependencies. Each edge may be linked to one or more adjacent facets 405n to identify which facets join together to form a edge that includes a fold, perforation, or other interlocking structural elements. Each edge is defined by a polyline 420 containing information about points that define coordinates or relation to a reference point.

Referring back to FIG. 3, the graphical design layout renderer may select 310 a facet of the desired three-dimensional structure and apply 315 semantic structural design data to rules from the graphical design style sheet for that facet to generate a portion of the graphical design template. This process will repeat 320 for each facet until the graphical design template for the three-dimensional structure is complete. In an embodiment, graphical design rules only be used for some (i.e., less than all) facets of the structure.

The system then receives graphical content to be applied to the structure 325. Graphical content may include, but is not limited to, text and/or the graphics to be placed on one or more exterior and/or interior surfaces of the package. The graphical content may include, without limitation, a shipping label, a logo, a symbol, a trademark, a photograph, an image, and/or a design. The graphical content may be linked 330 to the template based on the one or more rules to yield the graphic design. The applying and/or linking may include determining whether the graphical content is a background image, an image that will not fit on an intended facet, or another image that will span a plurality of facets. If so, the linking may include grouping the first facet and a second facet to form a facet group, and then linking the graphical content to the facet group so that when the three dimensional structure is printed, a first portion of the content appears on the first facet, and a second portion of the content appears on the second facet. This may include expanding the graphical content so that the background image spans adjacent facets.

Optionally, the proposed design may be displayed to a user on a display device 335, and the user may be permitted to change 340 one or more features of the graphic design. For example, the user may be allowed to change a graphic asset, move a graphic asset to another location, add a graphic asset, or remove it entirely. If the user makes a change, optionally the graphical design layout renderer compares the change to the graphic design style sheet to verify 345 that the change is permitted within the constraints of the style sheet and/or template. If the change is not permitted, the user may be required to make another change, or the change may simply be rejected. Ultimately, the graphical content may be printed 360 on the three dimensional packaging structure. In an embodiment, a printing device may be used to print the graphical content on the three dimensional packaging structure. Assembly devices may be used to assemble the printed structure.

Figure 5:
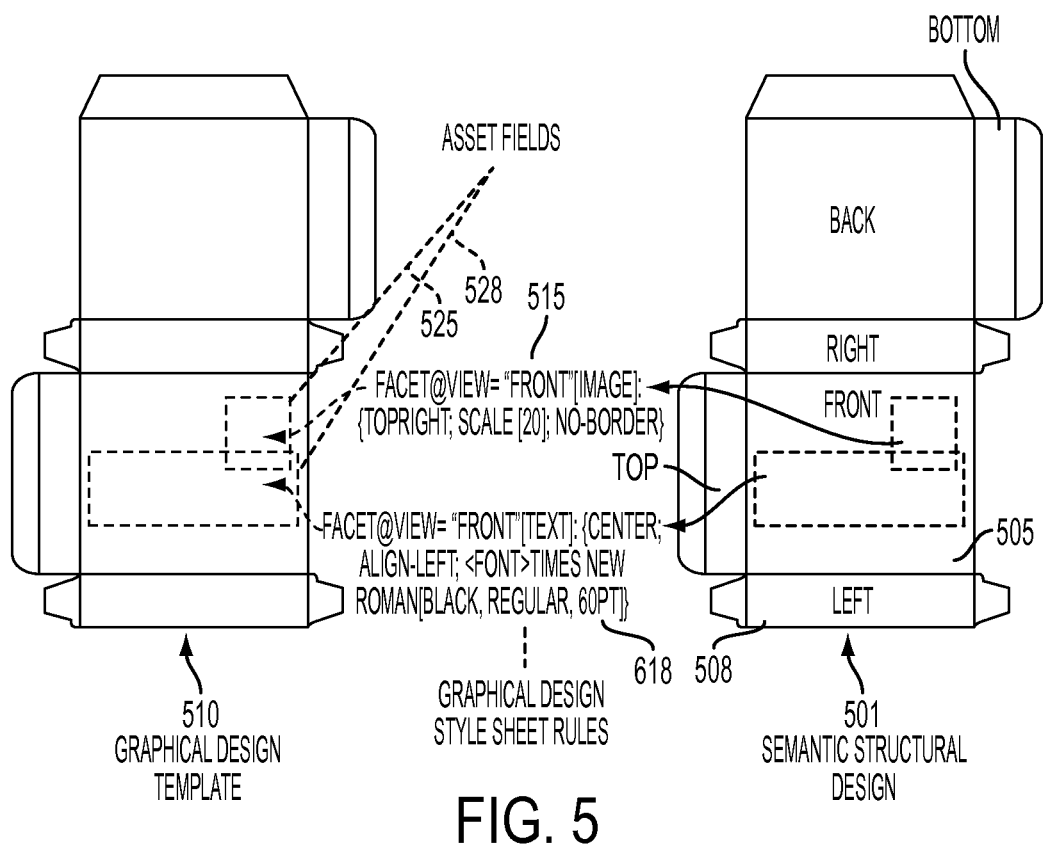
FIGS. 5 and 6 depict exemplary applications of a style sheet, semantic structural design, design template, and graphical design.
Figure 6:
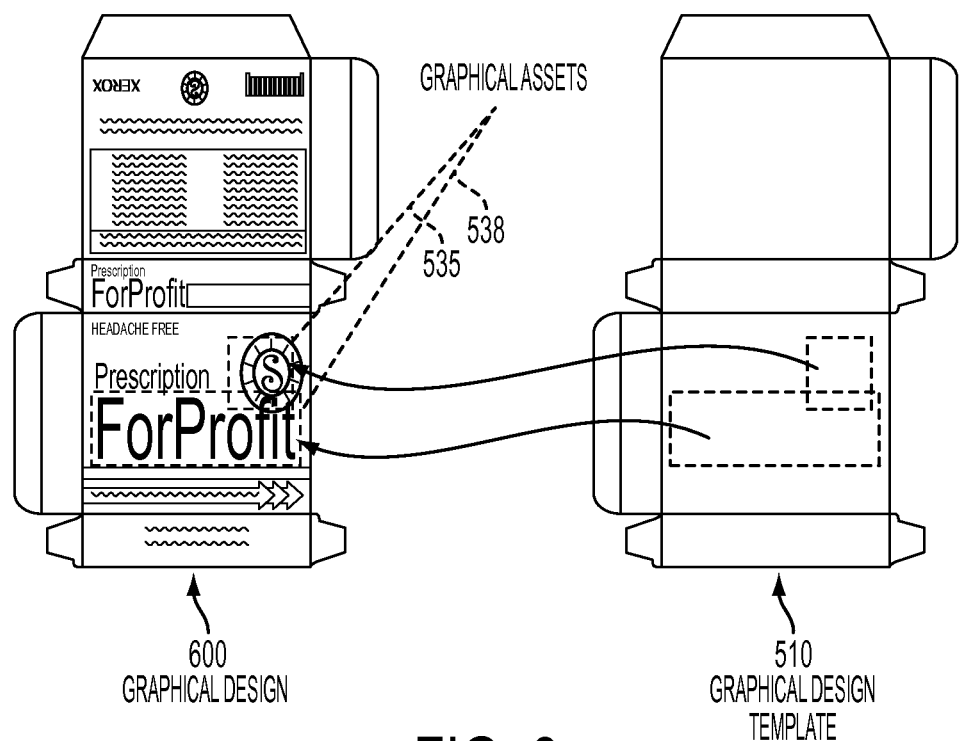

FIGS. 5 and 6 depict a relationship between a style sheet, a three-dimensional structural design, a design template, and a three-dimensional printed structure according to an embodiment. As shown in FIG. 5, a three-dimensional structure such as a package is represented by a semantic structural design and includes multiple facets 505, 508. A graphical design template 510 is created by applying rules 515, 518 from a style sheet to the structural design 501. As shown in FIG. 6, the template 510 may then be populated with particular graphic design data 535, 538 that will be printed on the various facets to yield a graphic design 600.

Figure 7:
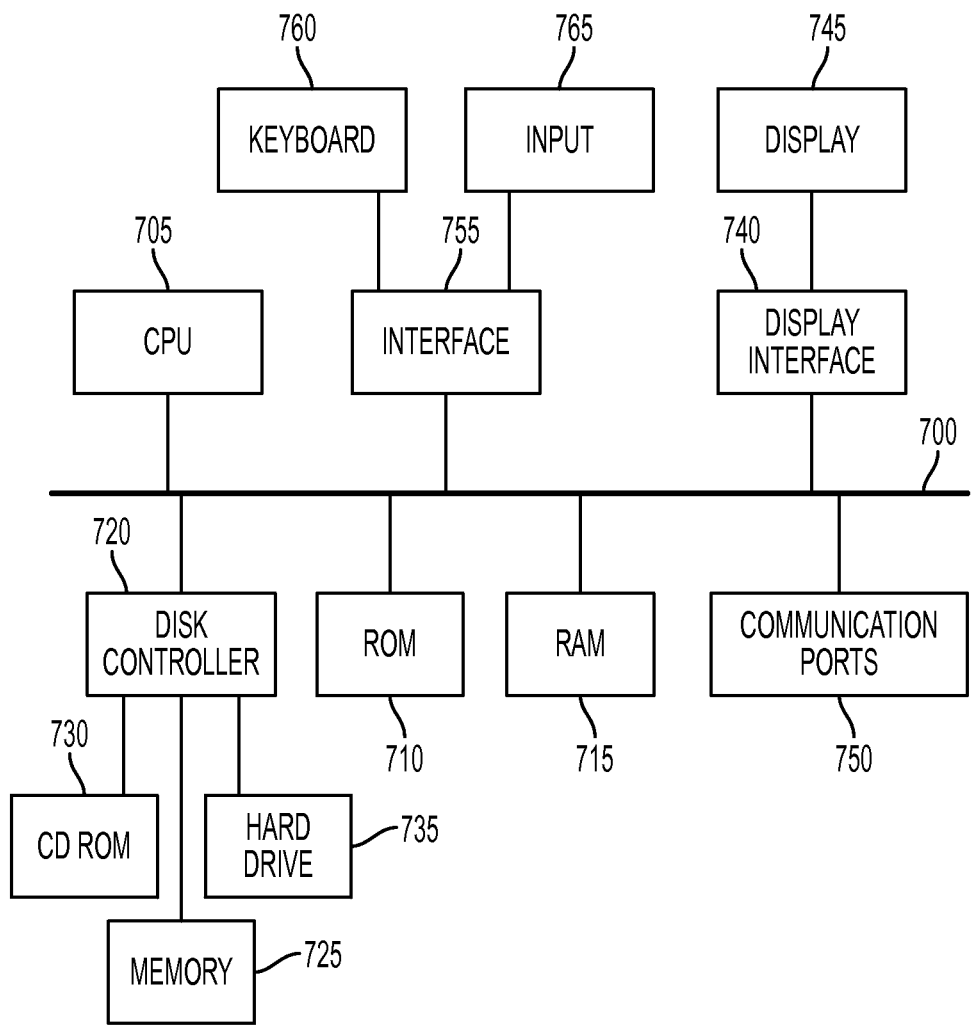
FIG. 7 depicts a block diagram of an exemplary system that may be used to contain or implement program instructions according to an embodiment.

FIG. 7 depicts a block diagram of exemplary internal hardware that may be used to contain or implement program instructions according to an embodiment. A bus 700 serves as the main information highway interconnecting the other illustrated components of the hardware. CPU 705 is the central processing unit of the system, performing calculations and logic operations required to execute a program. Read only memory (ROM) 710 and random access memory (RAM) 715 constitute exemplary memory devices.

A controller 720 interfaces with one or more optional memory devices 725 to the system bus 700. These memory devices 725 may include, for example, an external or internal DVD drive, a CD ROM drive 730, a hard drive 735, flash memory, a USB drive or the like. As indicated previously, these various drives and controllers are optional devices.

Program instructions may be stored in the ROM 710 and/or the RAM 715. Optionally, program instructions may be stored on a tangible computer readable medium such as a compact disk, a digital disk, flash memory, a memory card, a USB drive, an optical disc storage medium, such as Blu-Ray™ disc, and/or other recording medium.

An optional display interface 740 may permit information from the bus 700 to be displayed on the display 745 in audio, visual, graphic or alphanumeric format. Communication with external devices may occur using various communication ports 750. An exemplary communication port 750 may be attached to a communications network, such as the Internet or an intranet.

The hardware may also include an interface 755 which allows for receipt of data from input devices such as a keyboard 760 or other input device 865 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of printing content on a three dimensional structure, comprising:
   creating a graphical design style sheet for a three dimensional structure, wherein:
   the style sheet comprises a plurality of rules for graphical content to be printed on the structure, and wherein each rule comprises a selector that identifies a facet of the structure and a declaration, and
   creating the graphical design style sheet comprises:
   selecting a facet to be specified in the selector;
   selecting, for the selector, one or more attributes of the graphical content that will be affected by the rule's declaration; and
   including, in the declaration, a property and a value that sets forth an effect that the rule will have on the selected facet,
   applying, using a graphical design layout renderer, one or more of the rules for a first facet of the structure to first semantic structural design data to generate a first portion of a graphical design template for the structure;
   applying, using the graphical design layout renderer, one or more of the rules for at least one additional facet of the structure to additional semantic structural design data until the graphic design template is prepared;
   receiving graphical content to be applied to the structure; and
   by a processor, using one or more of the rules of the style sheet to automatically link the graphical content to the template to generate graphical design data for printing the graphical content on the structure in accordance with the rules.

2. The method of claim 1, further comprising printing the graphical content on the structure using the graphical design data.

3. The method of claim 1, further comprising:
   displaying the graphical content as it will appear on the structure;
   receiving a user selection to change an attribute of the graphical content;
   by a processor, verifying that the user selection is consistent with the rules; and
   responsive to the verifying, printing the graphical content with the user selection on the structure.

4. The method of claim 1, wherein linking the graphical content to the template comprises, by a processor:
   linking the graphical content to an intended facet; and
   using a declaration from a rule for the intended facet to determine a location of the graphical content on the structure; and
   applying the graphical content to the template at the determined location.

5. The method of claim 4, further comprising determining whether the graphical content will span a plurality of facets, and if so, wherein the linking comprises:
   grouping the first facet and a second facet to form a facet group;
   using the facet group as the intended facet; and
   linking the graphical content to the facet group so that when the structure is printed, a first portion of the graphical content will appear on the first facet, and a second portion of the graphical content will appear on the second facet.

6. The method of claim 1, wherein the semantic structural design data comprises:
   a type of facet;
   attributes of a plurality of edges associated with the first facet; and
   identification of at least one facet that is adjacent to the first facet.

7. The method of claim 1, wherein the graphical design data comprises:
   a plurality of asset fields, comprising at least one asset field for each of the first facet and at least one additional facet; and
   content to be printed in each of the asset fields.

8. The method of claim 1, wherein the graphic design template includes:
   a plurality of asset fields; and
   at least one style sheet rule for each asset field.

9. The method of claim 1, wherein the linking further comprises:
   determining that the graphical content comprises a background image, and
   expanding the graphical content so that the background image spans a plurality of the facets.

10. The method of claim 1, wherein the linking comprises:
    determining whether the graphical content will fit on an intended facet; and
    if the determining determines that the graphical content will not fit on the intended facet, then applying a first portion of the content to the intended facet and applying a second portion of the content to at least one adjacent facet.

11. The method of claim 1, wherein each declaration comprises a property and a value that sets forth an effect that the declaration's rule will have on the rule's identified facet.

12. A method of printing content on a three dimensional structure, comprising, by one or more processors:
    creating a graphical design style sheet for a three dimensional structure, wherein:
    the style sheet comprises a plurality of rules for graphical content to be applied to the structure, and wherein each rule comprises a selector that identifies a facet of the structure and a declaration, and creating the graphical design style sheet comprises:
  selecting a facet to be specified in the selector;
  selecting, for the selector, one or more attributes of the graphical content that will be affected by the rule's declaration; and
  including, in the declaration, a property and a value that sets forth an effect that the rule will have on the selected facet;
applying, using a graphical design layout renderer, one or more of the rules for a first facet of the structure to first semantic structural design data to generate a first portion of a graphical design template for the structure;
applying, using the graphical design layout renderer, one or more of the rules for at least one additional facet of the structure to additional semantic structural design data until the graphic design template is prepared;
receiving graphical content to be applied to the structure;
determining that the graphical content is to be applied to a first facet and at least one additional facet;
using one or more of the rules of the graphical design style sheet for the first facet and the at least one additional facet to link the graphical content to the template and generate graphical design data for printing a first portion of the graphical content on the first facet and a second portion of the graphical content on the at least one additional facet in accordance with the rules; and
printing the graphical content on the structure using the graphical design data.

13. The method of claim 12, wherein each declaration comprises a property and a value that sets forth an effect that the declaration's rule will have on the rule's identified facet.

14. A package design rendering system, comprising:
a first memory portion containing semantic structural design data;
a second memory portion containing a graphical design style sheet for a plurality of facets for a three-dimensional package, wherein the style sheet comprises a plurality of rules for graphical content to be applied to the structure, and wherein each rule comprises a selector that identifies a facet of the structure and a declaration;
a graphical design layout renderer comprising a set of programming instructions that, when executed by a processor, cause the processor to:
  create the graphical design style sheet by:
    selecting a facet to be specified in the selector,
    selecting, for the selector, one or more attributes of the graphical content that will be affected by the rule's declaration, and
    including, in the declaration, a property and a value that sets forth an effect that the rule will have on the selected facet, and
  apply one or more of the rules from the graphical design style sheet to the semantic structural design data to generate a graphical design template for the three-dimensional package;
an asset linker comprising a set of programming instructions that, when executed by the processor, cause the processor to use one or more of the rules from the graphical design style sheet to automatically link one or more graphical assets with the graphical design template to create a graphical design for the package.

15. The system of claim 14, further comprising:
a display that displays a representation of the graphical design on the package.

16. The system of claim 15, further comprising:
a user input that accepts a user-selected change to the graphical design.

17. The system of claim 14, further comprising:
a printing device that prints the graphical design on a substrate.

18. The system of claim 17, further comprising:
one or more assembly devices that form the substrate into the three-dimensional package.

19. The system of claim 14, wherein:
the graphical design layout renderer also comprises program instructions that, when executed by the processor, cause the processor to instruct the asset linker to determine whether the graphical content will span a plurality of facets, and if so, the asset linker also comprises program instructions that when executed by the processor, cause the processor to:
group the first facet and a second facet to form a facet group; and
link the graphical content to the facet group so that when the three dimensional structure is printed, a first portion of the content appears on the first facet, and a second portion of the content appears on the second facet.

20. The system of claim 14, wherein:
the graphical design layout renderer also comprises program instructions that, when executed by the processor, cause the processor to instruct the asset linker to determine whether the graphical content comprises a background image, and if so, the asset linker also comprises program instructions that when executed by the processor, cause the processor to expand the graphical content so that the background image spans a plurality of the facets.

21. The system of claim 14, wherein:
the graphical design layout renderer also comprises program instructions that, when executed by the processor, cause the processor to instruct the asset linker to determine whether the graphical content will fit on an intended facet, and if not, the asset linker also comprises program instructions that when executed by the processor, cause the processor to create the graphical design so that it will apply a first portion of the content to the intended facet and apply a second portion of the content to at least one adjacent facet.

22. The system of claim 14, wherein the semantic structural design data comprises an ontology that defines package design elements and, for each element, one or more attribute/value pairs.

* * * * *